(12) United States Patent
Murphy

(10) Patent No.: US 10,878,296 B2
(45) Date of Patent: Dec. 29, 2020

(54) FEATURE EXTRACTION AND MACHINE LEARNING FOR AUTOMATED METADATA ANALYSIS

(71) Applicant: DISCOVERY COMMUNICATIONS, LLC, Knoxville, TN (US)

(72) Inventor: Shane Murphy, Knoxville, TN (US)

(73) Assignee: DISCOVERY COMMUNICATIONS, LLC, Knoxville, TN (US)

( * ) Notice: Subject to any disclaimer, the term of this patent is extended or adjusted under 35 U.S.C. 154(b) by 75 days.

(21) Appl. No.: 16/382,872

(22) Filed: Apr. 12, 2019

(65) Prior Publication Data
US 2019/0325259 A1   Oct. 24, 2019

Related U.S. Application Data

(60) Provisional application No. 62/656,454, filed on Apr. 12, 2018.

(51) Int. Cl.
*G06K 9/62*   (2006.01)
*G06N 3/08*   (2006.01)

(52) U.S. Cl.
CPC .......... *G06K 9/628* (2013.01); *G06K 9/6227* (2013.01); *G06K 9/6257* (2013.01); *G06K 9/6259* (2013.01); *G06K 9/6262* (2013.01); *G06N 3/08* (2013.01); *G06K 2209/27* (2013.01)

(58) Field of Classification Search
CPC .. G06K 9/6259; G06K 9/6227; G06K 9/6257; G06K 9/00718; G06K 9/6262; G06K 9/628; G06K 2209/27; G06N 3/08; G06N 20/00
See application file for complete search history.

(56) References Cited

U.S. PATENT DOCUMENTS

2018/0157743 A1*  6/2018  Hori ....................... G06N 3/08

FOREIGN PATENT DOCUMENTS

WO    WO-2019100723 A1 *  5/2019  ............... G06K 9/62
WO    WO-2019100724 A1 *  5/2019  ............... G06K 9/62

* cited by examiner

*Primary Examiner* — Brenda C Bernardi
(74) *Attorney, Agent, or Firm* — J.A. Lindeman & Co. PLLC

(57) ABSTRACT

The invention relates to image processing systems, methods, and storage media for recognizing a scene type. The invention performs dynamic content analysis to extract features from an image and creates labels that include a text-based description of the items and the environment of the image. The invention then trains multiple predictive models and determines characterization labels for the image or scene. The invention can create multi-label classifications as well as multi-class classifiers. The text-based labels created by the invention extend generic classification labels into a domain-specific manner of defining and naming groups of images. The characterizing labels can be tagged to the image as metadata for further organization and consumption of the images or scenes.

23 Claims, 4 Drawing Sheets

FEATURE EXTRACTION AND MACHINE LEARNING FOR AUTOMATED METADATA ANALYSIS

CROSS REFERENCE TO RELATED APPLICATION

The present application claims the benefit of priority to Provisional Patent Application No. 62/656,454, filed Apr. 12, 2018, the entire contents of which are incorporated by reference in this application.

TECHNICAL FIELD

The invention relates to image processing systems and methods for recognizing a scene type. The invention creates multi-label classifiers that include a text-based description of what is in the image. The system then trains multiple predictive models and determines characterization labels for the image or scene. The text-based labels created by the invention extend generic classification labels into a domain-specific manner of defining and naming groups of images. The characterizing labels can be tagged to the image as metadata for further organization of the images or scenes.

BACKGROUND

Computer scientists continue to develop systems to understand surroundings in a single glance. While human recognition takes only a few milliseconds to recognize a category of an object or environment, visual recognition of computer systems has not yet evolved to such capabilities. Visual recognition and processing allows us to learn and remember a diverse set of places and archetypes.

Computer system scene understanding or recognition has advanced in recent years, where a scene is a view of a real-world surrounding or environment that includes more than one object. An image of a scene can include many physical objects of various types (e.g., people, animals, vehicles, and other objects). The objects in the scene interact with each other and their environment. For example, a picture of a ski resort can include three objects—a skier, a lodge, and a sky. Other scenes, such as an office, might include desks, chairs, and people. Scene understanding can be extremely beneficial in various situations, such as traffic monitoring, intrusion detection, robot development, targeted advertisements, and other circumstances.

Previous attempts to provide a technical solution and automate scene recognition have not provided a suitable solution in terms of the volume of images that can be quickly analyzed as well as the ability to create and track multi-label metadata describing the images and the scene. Manual categorization and metadata processing is tedious, time-consuming, and error prone, which makes automation paramount, for as many workloads as can be identified. Manual classification of images requires a long lag time as editors review materials and identify digital content for further consumption by users. The time and effort required to identify this content has been estimated to cost more than half-a-million dollars per year.

Prior systems have struggled to provide multi-label image classification systems with high accuracy and throughput. Realistic images include diverse semantic contents that need multiple visual concepts for classification. Multi-label classification is difficult because predicting the presence of multiple classes usually requires a deeper understanding of the input image. Previous systems such as the ImageNet large Scale Visual Recognition Challenge have attempted to refine multi-label classification networks pre-trainined on single-label classification data sets. But the classifiers trained for global image representations do not generalize well to the images in which objects from multiple classes are distributed in different locations, scales, and obstructions.

General purpose object detection frameworks exist (e.g. AWS Rekognition, Google Cloud Vision), but they are trained and tuned on detecting common, general purpose objects typically unsuitable for a constrained enterprise domain space. Enterprises have a need for results that include proprietary labels and domain-specific objects, attributes, and scenes. Training new multi-label classifiers to predict proprietary labels from raw images requires very large, curated, labeled datasets, considerable technical knowledge, and significant time and money. There exists a large gap between general purpose solutions, and a bespoke solution with labels from a constrained enterprise taxonomy, and this invention attempts to bridge the gap.

SUMMARY

The feature extraction and machine learning system for automated metadata analysis of the invention provides an automated technical solution to problems that exist in reliably recognizing objects, scenes, and environments and labeling those scenes with multi-class descriptive labels. The invention evaluates hundreds of thousands of images and petabytes of video. The invention automates analysis of the images and videos and performs scene recognition analysis to create and track metadata for the various media. The invention creates multi-label classifiers with a text-based description of what is in the image and captures semantic dependencies among multiple classes via a constrained taxonomy.

The invention significantly decreases the time, expertise, and resources required for multiclass metadata classification, and for mapping from a general purpose domain to an enterprise specific result. The invention can use a number of API services (e.g., Amazon Rekognition or Google Cloud Vision), as well as other custom neural networks, and the invention uses machine learning techniques to return object and scene detection in the form of multi-class text based labels that describe objects observed in the image. The invention simplifies a complex recognition problem into an easier one of identifying classes from a set of words or symbols instead of multi-megapixel digital images.

The invention transforms images into text-based labeling and multi-class identification, which provides a convenient means to manipulate within a number of important media domains. The invention addresses many scene recognition problems, including scenarios where a digital image is presented, and the system must determine what classes it belongs to. In the past, problems of this type, e.g. object recognition and multiclass classification, have been typically addressed through complicated means, including deep and convolutional networks.

To address the problem in the digital media environment, the invention operates on an existing digital library with approximately 100,000 human-categorized images that conform to a specific pre-defined (i.e., constrained) taxonomy, which are used to retrieve media content. Each of these images is tagged with one or more ground truth labels from a defined taxonomy. For example, a content creator may wish to search across the content library for all images tagged as "living room, mid-century model, primary colors brown and gray," or in a particular brand category, such as "cars" or "apparel" or "luxury," for example. From the 100,000 image library, a smaller subset tagged with the specific labels above is retrieved, and can then be used to generate new content, webpages, and other content.

The system of the invention ingests images and analyzes the images and labels the images with metadata indicative of a pre-defined taxonomy. The invention distinguishes the type of room shown, whether the images are of a particular color scheme, whether the scenes have plants in them, what type of furniture is in each of the images, and performs many other classifications based upon the defined taxonomy.

In one example embodiment of the invention, the images to be analyzed include approximately 60 high level categories (e.g., rooms and spaces, style, color, and other categories) and approximately 650 lower level classes (e.g., bedroom, living room, dining room, red, green, blue, midcentury modern, and other subcategories and classes). The invention provides new capabilities beyond a general-purpose solution like AWS Rekognition or Google Cloud Vision, because those products (and others) have their own predetermined class taxonomy that they must adhere to. Thus, the invention provides a custom solution that provides the classification scheme necessary to properly recognize and classify the digital images, videos, and other media in the content library. Given a specific image/video/medium, the invention classifies that image/video/medium as belonging to at least one category and likely several different categories (i.e., multi-class labeling). Examples include anything from the Core Taxonomy, such as Rooms and spaces, Style, Color, and other categories.

A general purpose solution provided by past work in the field is unsuitable for the media environment. Media managers, producers, and other media stakeholders need labels that conform to their specific taxonomy, not to a general purpose solution. The media content creators need to know what terms to use to search within their media library, because if they don't know what to ask for, they can't retrieve the content.

Training machine learning models in accordance with the invention using deep and convolutional techniques is highly technical and non-trivial, and typically requires significant computing power, time, and expertise. The invention provides a far-less computational intense way to accomplish tagging than training a new neural network. The invention allows editorial teams to spend less time cataloguing and tagging data and more time generating new content. The system generates multi-class text labels and uses a supervised machine learning process to train multiple predictive models. The system then sets up fan-out pipelines for automated classification.

Systems

One aspect of the present disclosure relates to a system configured for generating a trained model for a multi-label classification system. The system includes one or more hardware processors configured by machine-readable instructions. Under control of a feature extraction server configured with specific computer executable instructions, a receiving processor ingests a training set of pre-labeled training images from a content management system. The processor(s) are configured to ingest a set of associated ground truth labels, with each pre-labeled training image having a unique ground truth label set from a constrained enterprise taxonomy. The processor(s) are configured to store the ingested training set of images in an ingested image database. The processor(s) also are configured to store the set of associated ground truth labels in an image metadata database. The processor(s) are configured to record, in a training parameter database, a set of all unique ground truth labels identified from the ingested training set of images. The processor(s) are configured to initiate the import of each stored image of the training set of images into an object detection server.

The object detection server can include a pretrained object detection service that identifies a resultant set of object labels for each of the training set of images. The processor(s) can be configured to record, in the image metadata database, the resultant object labels identified by the pretrained object detection server for each stored image of the training set. The processor(s) can be configured to record, in a training parameter database, a set of all unique object detection labels identified from importing the training set of images into the object detection server. The processor(s) can be configured to train at least one multi-label classification algorithm running on a multi-label classification processor to ingest the multi-label object detection labels and the multi-label ground truth labels to map the set of object classification labels into a proprietary taxonomy.

The multi-label classification algorithm includes submitting the multi-label object detection labels as inputs to the multi-label classification algorithm and submitting the multi-label ground truth labels from the enterprise taxonomy as outputs from the multi-label classification algorithm. The multi-label classification algorithm includes discriminatively categorizing the multi-label object detection labels using at least one of a support vector machine, a Bayes classifier, a neural network, a random forest method, and a deep learning method neural network. The multi-label classification algorithm includes comparing the multi-label classification output of a discriminatively categorized object detection label set associated with an image from the training set to the ground truth label set for that same image. Comparing can include measuring a loss between the multi-label classification output of a discriminatively categorized object detection label set and the ground truth label set using maximum likelihood estimation, mean squared error, Hamming distance, and/or Jaccard difference. Comparing can include iteratively adjusting model parameters according to the algorithm to minimize loss. The processor(s) can be configured to save, in a model library database, a trained model for the multi-label classification system resulting from the training of the multi-label classification algorithm and the comparison of the output discriminatively categorized object classification label and the ground truth labels.

Methods

Another aspect of the present disclosure relates to a method for generating a trained model for a multi-label classification system. Under control of a feature extraction server configured with specific computer executable instructions, a receiving processor ingests a training set of pre-labeled training images from a content management system. The method includes ingesting a set of associated ground truth labels, with each pre-labeled training image having a unique ground truth label set from a constrained enterprise taxonomy. The method includes storing the ingested training set of images in an ingested image database and storing the set of associated ground truth labels in an image metadata database. The method includes recording, in a training parameter database, a set of all unique ground truth labels identified from the ingested training set of images. The method includes importing each stored image of the training set of images into an object detection server.

The object detection server can include a pretrained object detection service that identifies a resultant set of object labels for each of the training set of images. The method can include recording, in the image metadata database, the resultant object labels identified by the pretrained object detection server for each stored image of the training set. The method can include recording, in a training parameter database, a set of all unique object detection labels identified from importing the training set of images into the object detection server. The method can include training at least one multi-label classification algorithm running on a multi-label classification processor to ingest the multi-label object detection labels and the multi-label ground truth labels to map the set of object classification labels into a proprietary taxonomy.

As outlined above, the multi-label classification algorithm includes submitting the multi-label object detection labels as inputs to the multi-label classification algorithm and submitting the multi-label ground truth labels from the enterprise taxonomy as outputs from the multi-label classification algorithm. The multi-label classification algorithm includes discriminatively categorizing the multi-label object detection labels using at least one of a support vector machine, a Bayes classifier, a neural network, a random forest method, and a deep learning method neural network. The multi-label classification algorithm includes comparing the multi-label classification output of a discriminatively categorized object detection label set associated with an image from the training set to the ground truth label set for that same image. Comparing can include measuring a loss between the multi-label classification output of a discriminatively categorized object detection label set and the ground truth label set using a maximum likelihood estimation, a mean squared error, Hamming distance, and/or Jaccard difference. Comparing can include iteratively adjusting model parameters according to the algorithm to minimize loss. The method can include saving, in a model library database, a trained model for the multi-label classification system resulting from the training of the multi-label classification algorithm and the comparison of the output discriminatively categorized object classification label and the ground truth labels.

Computer-Readable Storage Media

Yet another aspect of the present disclosure relates to a non-transient computer-readable storage medium having instructions embodied thereon, the instructions being executable by one or more processors to perform a method for generating a trained model for a multi-label classification system. Under control of a feature extraction server configured with specific computer executable instructions, a receiving processor ingests a training set of pre-labeled training images from a content management system. The method includes ingesting a set of associated ground truth labels, with each pre-labeled training image having a unique ground truth label set from a constrained enterprise taxonomy. The method includes storing the ingested training set of images in an ingested image database and storing the set of associated ground truth labels in an image metadata database. The method includes recording, in a training parameter database, a set of all unique ground truth labels identified from the ingested training set of images. The method includes importing each stored image of the training set of images into an object detection server.

The object detection server can include a pretrained object detection service that identifies a resultant set of object labels for each of the training set of images. The method can include recording, in the image metadata database, the resultant object labels identified by the pretrained object detection server for each stored image of the training set. The method can include recording, in a training parameter database, a set of all unique object detection labels identified from importing the training set of images into the object detection server. The method can include training at least one multi-label classification algorithm running on a multi-label classification processor to ingest the multi-label object detection labels and the multi-label ground truth labels to map the set of object classification labels into a proprietary taxonomy.

The multi-label classification algorithm includes submitting the multi-label object detection labels as inputs to the multi-label classification algorithm and submitting the multi-label ground truth labels from the enterprise taxonomy as outputs from the multi-label classification algorithm. The multi-label classification algorithm includes discriminatively categorizing the multi-label object detection labels using at least one of a support vector machine, a Bayes classifier, a neural network, a random forest method, and a deep learning method neural network. The multi-label classification algorithm includes comparing the multi-label classification output of a discriminatively categorized object detection label set associated with an image from the training set to the ground truth label set for that same image. Comparing can include measuring a loss between the multi-label classification output of a discriminatively categorized object detection label set and the ground truth label set using a maximum likelihood estimation, a mean squared error, Hamming distance, and/or Jaccard difference. Comparing can include iteratively adjusting model parameters according to the algorithm to minimize loss. The method can include saving, in a model library database, a trained model for the multi-label classification system resulting from the training of at least one multi-label classification algorithm and the comparison of the output discriminatively categorized object classification label and the ground truth labels.

These and other features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Past third party external services use deep learning and other machine learning methods that transform images into text based labels. For instance, given a particular photo, an API service, such as AWS Rekognition service or Google Cloud Vision service can return a JSON text-based response that identifies the generic objects in the image along with a confidence score, such as, for example, "Furniture 90%, carpet 85%, chair 80%." The invention provides new capabilities and features over and above these services by extending generic classification labels into a domain-specific manner of defining and naming groups of images with multi-label classifiers.

The invention makes use of the deep and convolutional networks to map a complex and difficult general purpose solution to a simpler proprietary custom taxonometric class. The networks can be trained as part of the overall process of the invention, or the invention can use networks and models trained by others. In one example embodiment of the invention, the system uses an application program interface that receives an input image and returns labels with confidence values. The determined multi-class labels can be immediately integrated with editorial tools (e.g., MediaDesk), and allows concurrent modification of the classification and judgment of accuracy and suitability of various techniques and models. Once a predetermined level of accuracy and suitability is achieved, the images are made available for use and consumption, such as by a browser or other user computer system.

The invention transforms a difficult multi-class labeling problem into an easy one, and a general-purpose solution into a domain-specific one, by using existing services to map the custom-tagged digital images into general-purpose text labels, and then using those returned text labels as input to a machine learning system that outputs a prediction of membership in a class according to an enterprise's constrained taxonomy. The invention greatly reduces the computing resources needed to generate multi-class labels without sacrificing accuracy and relevance. The invention provides a computer-implemented method for generating a trained model for a multi-label classification system as well as a computer-implemented method for using the trained model to predict multi-label classification of an image.

System Configuration

Figure 1:
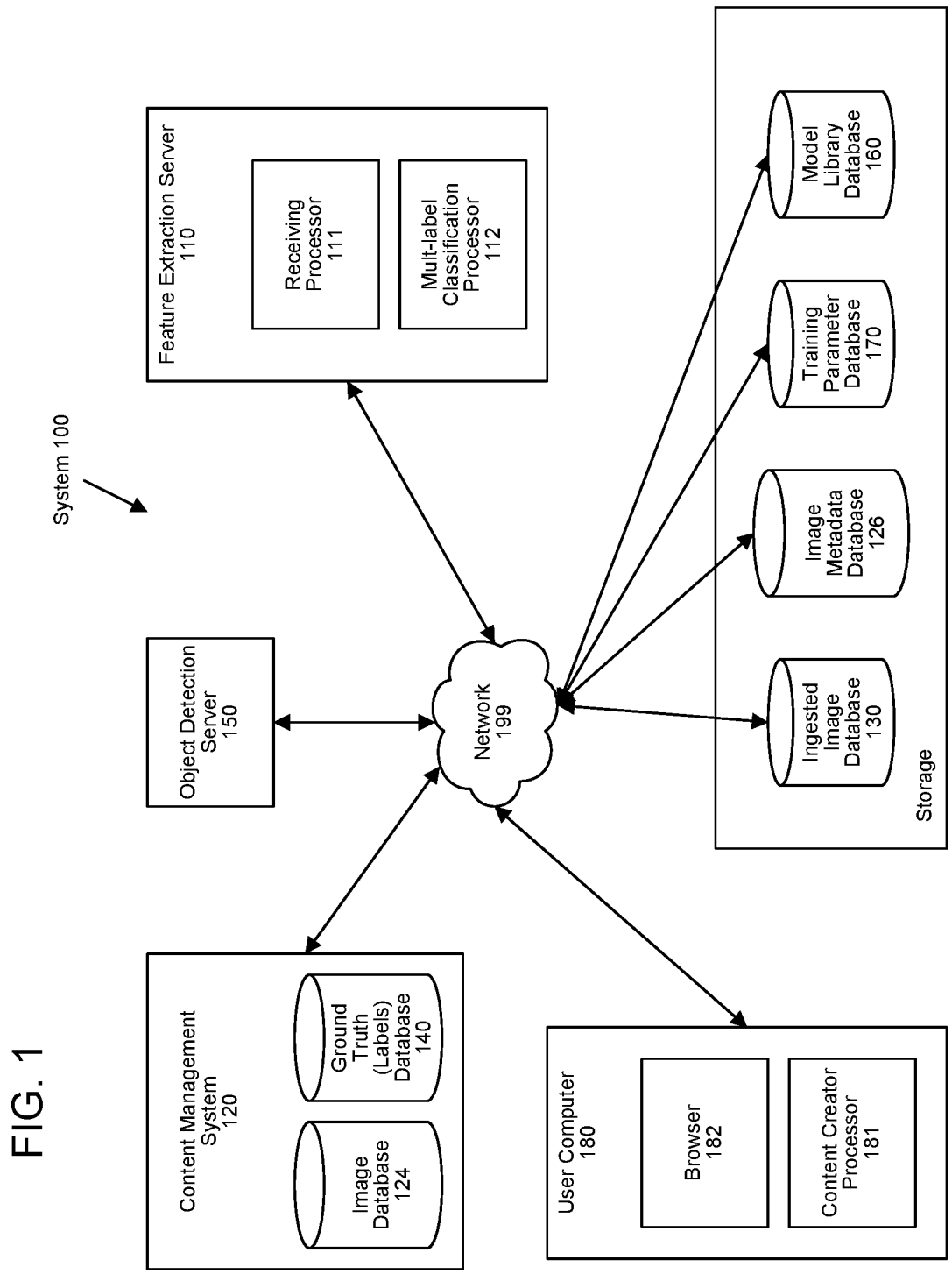
FIG. 1 shows a computer architecture diagram of a system with computer hardware, applications, and services that carry out feature extraction and machine learning for automated metadata analysis in accordance with one or more implementations of the claimed invention.

FIG. 1 shows an exemplary computer system 100 with computer hardware, applications, and services for generating a trained model for a multi-label classification system and for using a trained model to predict multi-label classification of an image. The system 100 is configured for carrying out feature extraction and machine learning for automated metadata analysis in accordance with the claimed invention over a communications network 199, such as the Internet, wired and wireless local and wide area networks, private networks (e.g., an enterprise private network), virtual private networks, and other computer and telecommunications networks. In some implementations, system 100 includes one or more computing platforms configured to communicate with each other over communications network 199 according to a client/server architecture, a peer-to-peer architecture, and/or other architectures. The system 100 can also communicate with other remote platforms that are not explicitly shown in FIG. 1 using communications network 199.

The computing platforms 110, 120, 124, 126, 130, 140, 150, 160, 170, 180 can include servers, such as feature extraction server 110 that includes a receiving processor 111 and a multi-label classification processor 112. The system also includes a content management system 120 as its own server with an image database 124 and a ground truth (labels) database 140. The system 100 also utilizes an object detection server 150. The receiving processor 111 controls the execution of the system and performs required mathematical and other operations. The multi-label classification processor 112 controls execution of steps involving training and prediction. Databases 130, 140, 160, and 170 store and retrieve data related to the system 100. Databases 124 and 126 store and retrieve images from the enterprise library, to be used for training or prediction. The user computer 180 provides an interface for the system, to be used by content creators and content consumers. The object detection server 150 ingests digital images, and outputs general-purpose labels to be used by the feature extraction server and storage layers for training and prediction.

Computing platform(s) 110, 120, 124, 126, 130, 140, 150, 160, 170, 180 can include electronic storage 124, 126, 130, 140, 160, 170 one or more processors 111, 112, 181 and other computer components, such as communication lines, or ports to enable the exchange of information with the communications network 199 and with other computing platforms. Illustration of the system 100 and the computing platform(s) 110, 120, 130, 140, 150, 160, 170, 180 in FIG. 1 is not intended to be limiting. The computing platforms 110, 120, 130, 140, 150, 160, 170, 180 can include a plurality of hardware, software, and/or firmware components operating together to provide the functionality attributed herein to computing platform(s) 110, 120, 130, 140, 150, 160, 170, 180. For example, computing platform(s) 110, 120, 130, 140, 150, 160, 170, 180 may be implemented in the cloud of computing platforms operating together as system 100.

The computing platform(s) 110, 120, 124, 126, 130, 140, 150, 160, 170, 180 can be configured by machine-readable instructions stored in a memory or in other storage media (described further below) that, when executed by processors in the computing platforms, carry out the steps and methods of the invention and cause the steps and methods of the invention to be carried out. The machine-readable instructions can include computer programs, applications, services, and other instructions.

Electronic storage (e.g., storage media) can include non-transitory storage media that electronically stores information. The electronic storage media can include one or both of system storage that is provided integrally (i.e., substantially non-removable) with computing platform(s) 110, 120, 124, 126, 130, 140, 150, 160, 170, 180 and/or removable storage that is removably connectable to computing platform(s) 110, 120, 124, 126, 130, 140, 150, 160, 170, 180 via, for example, a port (e.g., a USB port, a firewire port, etc.) or a drive (e.g., a disk drive, etc.). Electronic storage media can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage media can include one or more virtual storage resources (e.g., cloud storage, a virtual private network, and/or other virtual storage resources). Electronic storage media can store software algorithms, information determined by processor(s) 111, 112, 181, information received from computing platform(s) 110, 120, 124, 126, 130, 140, 150, 160, 170, 180 information received from remote platform(s), and/or other information that enables computing platform(s) 110, 120, 124, 126, 130, 140, 150, 160, 170, 180 to function as described herein. The databases 124, 126, 130, 140, 160, 170 shown in FIG. 1 are instantiated in electronic storage media.

In FIG. 1, the receiving processor 111, multi-label classification processor 112, and content creator processor 181 are explicitly shown, but all computing platforms/servers 110, 120, 124, 126, 130, 140, 150, 160, 170, 180 include at least one processor. Processor(s) 111, 112, 181 in the computing platforms/servers are configured to provide information processing capabilities, such as executing computer readable instructions stored on a computer readable medium. As such, processor(s) 111, 112, 181 may include one or more of a digital processor, an analog processor, a digital circuit designed to process information, an analog circuit designed to process information, a state machine, and/or other computer mechanisms for electronically processing information. Although processor(s) 111, 112, 181 are shown in FIG. 1 as single entities, this is for illustrative purposes only. In some implementations of the invention, processor(s) 111, 112, 181 may include a plurality of processing units. These processing units may be physically located within the same device, or processor(s) 111, 112, 181 may include processing functionality of a plurality of devices operating in coordination. Processor(s) 111, 112, 181 may be configured to execute the computer readable instructions by software, hardware, firmware, or a combination of software, hardware, and/or firmware, and/or other mechanisms for configuring processing capabilities on processor(s) 111, 112, 181. This may include one or more physical processors during execution of computer readable instructions, processor readable instructions, circuitry, hardware, storage media, and other components.

Figure 2:
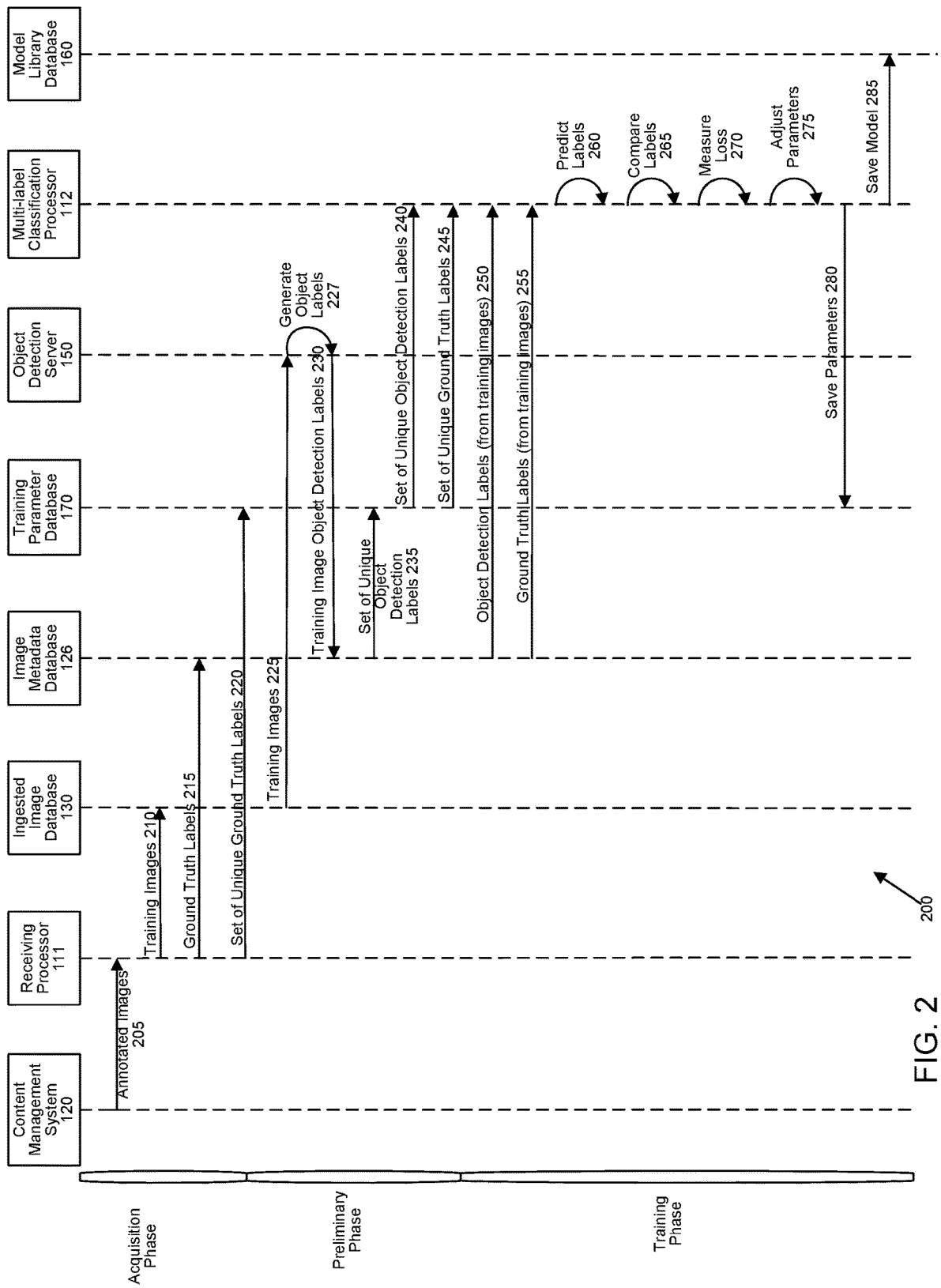
FIG. 2 shows a sequence diagram of a computer system performing a method of training a model to perform multi-label classification using feature extraction and machine learning for automated metadata analysis in accordance with one or more implementations of the claimed invention.
Figure 4:
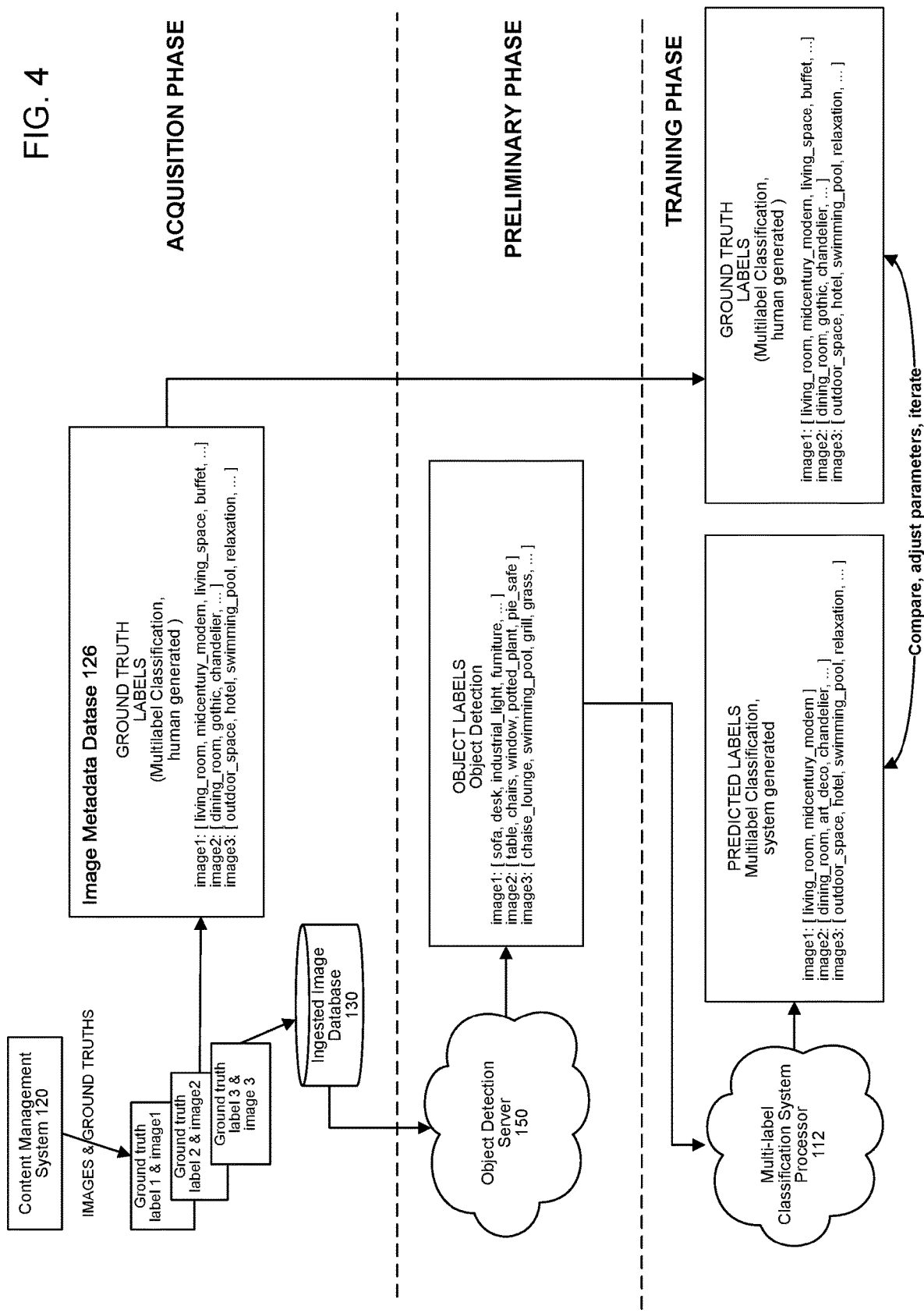
FIG. 4 shows an overview flow diagram of a computer system training a model to perform multi-label classification in accordance with one or more implementations of the claimed invention.

FIG. 2 illustrates a sequence diagram with a method 200 for generating a trained model for a multi-label classification system, in accordance with one or more implementations of the invention. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting. While FIG. 2 provides a detailed sequence diagram for generating a trained model for a multi-label classification system, FIG. 4 provides an overview of the trained model generation that provides a supplemental description of the method for additional clarification.

Training the Model—Acquisition Phase

The feature extraction server 110 is configured with computer executable instructions to cause the computer platform components and services to carry out the methods of the invention. As shown in FIGS. 1-4, in an acquisition phase, the feature extraction server 110 receives images for processing in accordance with the invention. The images can be received from a content management system (CMS) as shown in block 205 or from another entity that creates, edits, organizes, or publishes digital content. In one embodiment of the invention, the feature extraction server 110 ingests images for processing over communications network 199 from a content creator's CMS system 120 using receiving processor 111 configured by machine-readable instructions as shown in FIGS. 1-4. The images can be sent from processing from a digital library 124 associated with the content management system 120.

The images received by the feature extraction server 110 are stored in ingested image database 130 in block 210, while the ground truth labels are stored in image metadata database 126 in block 215. Each received image has at least one ground truth label from a predefined custom class from a constrained enterprise taxonomy. A ground truth label includes at least one confirmed descriptive characteristic of the pre-labeled image. For example, a photograph of chef Giada DeLaurentiis may have a ground truth label "Giada DeLaurentiis" confirming her identity in the photograph. As shown further in FIG. 4, ingested image 1 might be a digital image of a room and include ground truth labels "living_room, midcentury_modern, living_space, buffet" and other ground truth labels, while image 2 might be a different type of room and include ground truth labels "dining_room, gothic, chandelier," and other ground truth labels.

In one example embodiment of the invention, the ground truth labels include proprietary labels from a constrained enterprise taxonomy of a source provider, where the source provider supplies the digital images or other digital content. As outlined above, the ground truth labels are stored as metadata in an image metadata database 126. The image metadata database 126 in which the ground truth labels are stored can be a separate database from the ingested images database 130. Databases 130, 126 can be linked to feature extraction server 110 directly or otherwise available over communications network 199.

In block 220, the receiving processor 111 stores the set of all unique ground truth labels in the training parameter database 170. The set of all unique ground truth labels is generated by parsing through all label sets for all images and compiling a separate set of all unique labels that appeared in at least one of the training images. For example, [cat, dog, fish], [cat], [ ], [fish, squirrel] might be the labels associated with 4 images, and the resultant UNIQUE SET from all of these individual sets would be [cat, dog, fish, squirrel]. The invention stores both the set of ground truth labels associocciated with each image (in the image metadata database 126) and the set of all unique ground truth labels (in training parameter database 170) for use in encoding a binary representation of a multilabel set (described further below).

In this acquisition phase, the invention receives a set of images, with each image having one or more ground truth descriptive labels from the constrained enterprise taxonomy. To train the models of the invention, images and their respective ground truth labels are split into two groups of data that include a training group of images with their ground truth labels and a test group of images with their ground truth labels. In one example model of the invention, the two groups can include 90% training data and 10% test data. The training data is used to train the model, and the test data is withheld from the model and will be used to test the accuracy of the model. Once the images and ground truth labels are ingested and stored, the process moves to a preliminary phase.

Training the Model—Preliminary Phase

In block 225, in a preliminary phase of training the model, each image from the training set is imported into an object detection system, such as object detection server 150 in FIGS. 1-4. In one example embodiment of the invention, the object detection server 150 includes a pretrained object detection service. The object detection server 150 can include a pretrained object detection service such as Amazon Rekognition, Google Vision, a pre-trained neural network, a customized neural network, and other object detection services.

In block 227, the object detection server 150 identifies and generates a resultant object label or a set of labels for each of the images in the training set of images. The set of object labels may include zero or more object labels. The object label(s) represent the objects appearing within that image. That is, the object labels are a list of what the object detection server 150 thinks it sees in the image. The set of object labels also includes a confidence score for each of the object labels in the set. For example, for one ingested image, the object detection server 150 may return a list of labels such as that shown in Table 1 below.

TABLE 1

| Feature | Confidence Score |
|---|---|
| Man | 0.80 |
| Basketball | 0.85 |
| Cat | 0.75 |

The list of labels shows that the object detection server 150 is 80% confident that the image includes a man, 85% confident that the image includes a basketball, and 75% confident that the image includes a cat. The list of labels can be extensive and can be based upon a cut-off confidence score (e.g., show all items with a confidence score of 70% or higher). The list of labels provided by the object detection server 150 is a generic list of features for each image in the training set that may or may not be relevant to the use of the image contemplated by the enterprise.

As shown further in FIG. 4, object detection server 150 generates object labels for each of the ingested training images. The object labels for image 1 might include "sofa, desk, industrial_light, furniture" along with a corresponding confidence score (not shown). The object labels for image 2 might include "table, chairs, window, potted_plant, pie_safe" and other object labels along with their respective confidence scores. The object labels generated by the object detection server 150 can be stored in object label database 160. The object detection server 150 may return zero, one, or more object labels. If the object detection server 150 returned zero object labels, it would mean that there are no relevant descriptive labels identified for an image. A single label set (of zero, one, or more labels) is associated with each image and recorded for each image. In block 230, the resultant object labels identified by the pretrained object detection server 150 for each stored image of the training set are stored in the image metadata database 126.

Additionally, in block 235, the set of all unique object labels is recorded in the training parameter database 170. The set of all unique object labels is generated by parsing through all label sets for all images and compiling a separate set of all unique labels that appeared in at least one of the training images. For example, [cat, dog, fish], [cat], [ ], [fish, squirrel] might be the labels associated with 4 images, and the resultant UNIQUE SET from all of these individual sets would be [cat, dog, fish, squirrel]. The invention stores both the set of object labels assocociated with each image and the set of all unique object labels for use in encoding a binary representation of a multilabel set (described further below).
Training the Model—Training Phase To start the training phase, in block 240, the feature detection server 110 forwards the set of all unique object labels recorded in the training parameter database 170 to multi-label classification server 112. Similarly, in block 245, the feature detection server 110 forwards the set of all unique ground truth labels recorded in the training parameter database 170 to multi-label classification server 112.

In training phase, the system and method of the invention feeds the object labels created in the preliminary phase into a multi-label classification processor and trains the multi-label classification processor to generate predicted labels from the original ground truth label set. For example, in block 250 the feature detection server 110 forwards the object labels from the image metadata database 126 to the multi-label classification processor 112 and converts the object labels as returned text responses from all images in the training set of images to a frequency matrix of terms. In one example embodiment of the invention, the frequency matrix of terms is a "bag of words." The bag of words can be words or text in the label without grammar or order that is used for feature extraction. The bag of words is then used as input to the multi-label classification processor 112.

The system 100 uses the bag of words along with the pre-classified training image labels to train a multi-label classifier algorithm running on the multi-label classification processor 112. The multi-label classifier algorithm can include as multinomial logistic regression (e.g., using a tool like scikit-learn). The multi-label classification processor 112 can also includes a multi-label classification algorithm such as a support vector machine, a Bayes classifier, a neural network, a Random Forest method, and a deep learning method neural network. As outlined above, the system 100 can split the training data, using many of the data to train the system and model and using the remainder to test the model. The system 100 also can incorporate multiple passes through decision trees, random forest, k nearest neighbors, multinomial logistic regression, as well as other algorithms to derive the image-labels relationships.

In addition to forwarding the object labels from the image metadata database 126 to the multi-label classification processor 112 in block 250, the feature extraction server 110 directs the ground truth labes from the training images from the image metadata database 126 to the multi-label classification processor 112 in block 255.

The multi-label classification algorithm receives the submitted object detection labels as inputs (from block 250 above) and discriminatively categorizes the encoded multi-label object detection labels in block 260 using at least one of a support vector machine, a Bayes classifier, a neural network, a Random Forest method, and a deep learning method neural network.

In one example embodiment of the invention, the multi-label classification processor 112 pre-processes the object detection labels as input features to the multi-label classification algorithm. The pre-processing can include converting the set of all unique object labels into an encoded multi-label format for an input of the trained model and converting the set of associated ground truth labels into the encoded multi-label format as an output of the trained model.

In block 265, the algorithm compares a discriminatively categorized object detection label of the multi-label classification algorithm to the ground truth labels. This comparison includes measuring a loss (in block 270) between the discriminatively categorized object classification label and a ground truth label using at least one of a maximum likelihood estimation (MLE) and a mean squared error (MSE). The multi-label classification processor 112, in block 272, then saves the now-trained model for the multi-label classification system resulting from the training of at least one multi-label classification algorithm and the comparison of the output discriminatively categorized object classification label and the ground truth labels in a model library database 160.

If acceptable accuracy is obtained after training, the process stops. If unacceptable accuracy is realized, in block 275, the system 100 can adjust characteristics and parameters in the object detection server 150 such as confidence values, min or max objects appearing, disambiguation, refinement, and other object detection parameters to tune the model. Additionally, the system 100 can also adjust hyperparameters in the multi-label classification processor 112, until acceptable accuracy is realized. The hyperparameters can include random forest maximum depth or number of estimators, neural network architecture, and/or learning rate to improve multi-label prediction performance.

Tuning the model can also include identifying an appropriate accuracy metric for multi-class or multi-label classification, such as measuring a relationship between input ground truths and output multi-label results from the multi-label classification model using Jaccard similarity coefficient, Hamming distance, and/or simple matching coefficient and comparing the measured relationship to a pre-determined multi-label prediction performance criterion.

If the measured relationship does not meet or exceed the multi-label prediction performance criterion, the model can be tuned by adjusting label confidence thresholds and/or label n-gram tokenization of the pre-trained object detection service to improve multi-label prediction performance. The model can also be tuned by modifying the pre-trained object detection service to include a neural network, logistic regression, and/or random forest, to improve multi-label prediction performance. Further, the model can be tuned by amending hyperparameters in the object detection service, where the hyperparameters include random forest maximum depth or number of estimators, neural network architecture, and/or learning rate to improve multi-label prediction performance. Additionally, the model can be tuned by augmenting the ingested training set of pre-labeled training images using translation, mirroring, rotation, and/or cropping. Any modified input parameters and/or modified hyperparameters are stored in the training parameter database 170 in block 280. One or more tuning techniques can be repeated until the measured relationship meets or exceeds the pre-determined multi-label prediction performance criterion.

In one example embodiment of the invention, training of the system includes deriving a set of unique object labels appearing in the training set of images, creating a vector input space based on the derived set of unique object labels, and converting the object labels for each of the training set of images to a binary classifier based on the created vector space. The binary classifiers are then submitted as inputs to the multi-label classification algorithm.

Similarly, the outputs of the algorithm and be further defined as well. For example, training the system can include receiving a set of unique ground truth labels appearing in the training set of images, creating a vector output space based on the derived set of received ground truth labels, and converting the ground truth labels for each of the training set of images to a binary classifier based on the created vector space. The discriminatively categorized object label of the multi-label classification algorithm can then be compared to the converted ground truth label.

One example implementation of the training of the model includes encoding the resultant set of object labels into unique binary feature vectors. For instance, the system creates an array from 1 to the counted size of unique objects appearing in the entire object label set. For example, the array may include five objects: 1: aardvark; 2: apple; 3: baby; 4: bathtub; 5: bear. An example image contains objects [aardvark, baby, bear]. The input vector is created to use a 1 for any object that is present in the image, and 0 for any object that is not present in the image. The example image with [aardvark, baby, bear] becomes [1, 0, 1, 0, 1] as a vector array because aardvark, baby, and bear are present in the image, but apple and bathtub do NOT appear in this particular image. All input object label input vectors are thus normalized to the same length, from 1 to the counted size of unique objects appearing in the entire object label set. Extending the above example, there may be vectors such as [1, 0, 1, 0, 1], [1, 1, 0, 0, 0], [0, 0, 0, 0, 1] representing the objects that appear in 3 particular images.

As outlined above, the invention similarly binarizes all ground truth labels appearing in the ground truth label set, for all images. One example of the set of ground truth labels might include [living_room, midcentury_modern, living_space], which can be represented in a binary notation as [1, 0, 0, 1, 0, 0, 1, 0,], and so forth, for all training set images. The length of all output multi-label classification vectors are thus normalized to a size of 1 to (the numerical count of unique ground truth labels appearing in the training set).

The system iteratively feeds each object detection input vector from our training set into the multi-label classification processor and measures each prediction against the known ground truth labels for each image. The multi-label classification algorithm (e.g., decision tree, random forest, logistic regression, neural net, or customized algorithm) adjusts internal weights of the confidence thresholds, label n-gram tokenizations, neural network, logistic regression, random forest, hyperparameters, and training set of images (using translation, mirroring, rotation, and cropping) to increase the accuracy of a match to the ground truth labels.

After training is complete, images from the test data set are processed through object detection and then through the multilabel classifier, and the results are measured. When performance is acceptable (i.e., above a predetermined accuracy threshold), the system stops, and the model is saved (in block 285) and is ready for use.

If performance is insufficient (i.e., below the predetermined accuracy threshold), the system adjusts input parameters, hyperparameters, and the other iterative performance factors outlined above and again performs object detection and multilabel classification across the training set until performance is acceptable. As outlined above, accuracy of the object detection results to the multi-label classification can be measured with Jaccard similarity coefficient, Hamming distance, and/or Simple Matching Coefficient (Rand similarity coefficient). For example, an object label vector of [1, 0, 0, 1] is compared against a ground truth vector of [1, 0, 0, 1] and is a 100% match, because all pairs match (position matters). An object label vector of [1, 0, 0, 1] is compared against a ground truth vector of [1, 0, 0, 0] and is a 75% match, because 3 of the 4 pairs of labels match.

Using the Model—Acquisition Phase

Once a trained model is created in accordance with the invention as described above, it can be used to tag unannotated images, that is, images without associated object labels or ground truths. For example, a content creator, such as a real life entertainment provider, may have a backlog of digital content, including images and videos. Previous attempts to provide a technical solution and automate scene recognition and multi-label classification have not provided a scalable solution that can process the volume of images or quickly analyze and create and track multi-label metadata describing the images and the scene. Manual categorization and metadata processing of the hundreds of thousands of images in a content creator's databases is tiresome, inefficient, and inaccurate, which makes automation vital. Manual classification of images requires a long lag time as editors review images and videos and identify digital content for further consumption by users. Using a trained model, such as that created and described above, content creators and others can address these issues and others with an elegant and efficient solution and use the labeled images as monetized assets to drive revenue.

As shown in FIGS. 1-4, the trained models in accordance with the invention receive unannotated images from a content management system images database and annotate the images with labels consistent with the enterprise constrained taxonomy. The content management system images database from which the unannotated images are received can be the same images database 124 shown in FIG. 1, or can be a separate network-connected database than the one in which the training images are stored. For simplicity, in the discussion below, the content management system images database is the same database 124.

Figure 3:
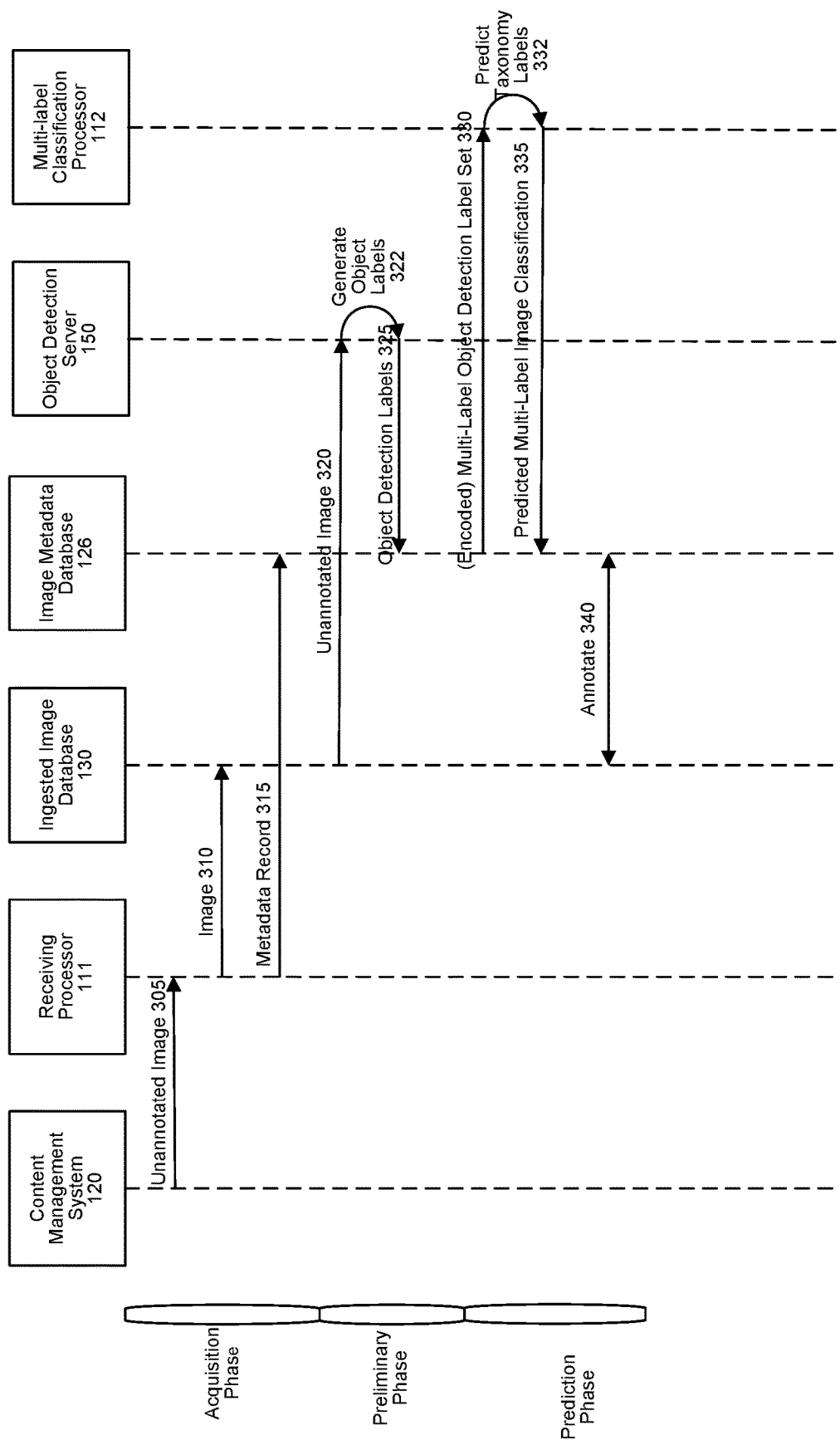
FIG. 3 shows a sequence diagram of a computer system performing a method of multi-label classification using a trained model for feature extraction and machine learning for automated metadata analysis in accordance with one or more implementations of the claimed invention.

FIG. 3 illustrates a sequence diagram with a method 300 for using a trained model for a multi-label classification system in accordance with one or more implementations of the invention. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting. FIG. 3 provides a detailed sequence diagram for using a trained model for a multi-label classification system.

In one example embodiment of the invention, the system 100 is under control of the feature extraction server 110 configured with specific computer executable instructions to cause the computer platform components and services to carry out a computer-implemented method for using a trained model to predict multi-label classification of an image. As shown in FIGS. 1-4, in an acquisition phase, the feature extraction server 110 receives unannotated images for processing in accordance with the invention. The images can be received from a content management system (CMS) as shown in block 305 or from another entity that creates, edits, organizes, or publishes digital content. In one embodiment of the invention, the feature extraction server 110 ingests the unannotated images for processing over communications network 199 from a content creator's CMS system 120 using receiving processor 111 configured by machine-readable instructions as shown in FIGS. 1-4. The images can be sent from processing from a digital library 124 associated with the content management system 120. In one example implementation of the invention ingesting the unannotated digital image with the receiving processor can includes processing an MD5, SHA-1, and/or SHA-256 hash sum of the unannotated image and a URL of the unannotated digital image to be ingested.

The images received by the feature extraction server 110 are stored in ingested image database 130 in block 310, and while there are no associated ground truth labels associated with the unannotated image(s), the receiving processor 111 creates a metadata record for the unannotated digital image in block 315, where the metadata record includes a unique identifier indicating a location where the ingested unannotated digital image is stored. In one example implementation of the invention, the unique identifier can be created as a fingerprint from the MD5, SHA-1, and/or SHA-256 hash sum of the unannotated image and the URL of the unannotated digital image ingested.

The metadata record itself is stored in image metadata database 126. As described above, the image metadata database 126 in which the metadata records are stored can be a separate database from the ingested images database 130 and can be linked to feature extraction server 110 directly or otherwise available over communications network 199. Once the images are ingested and stored and the metadata records are created and stored, the process moves to a preliminary phase.

Using the Model—Preliminary Phase

In block 320, in a preliminary phase of using the model, each unannotated image from the ingested image database 130 is imported into an object detection system, such as object detection server 150 in FIGS. 1-4. In one example embodiment of the invention, the object detection server 150 includes a pretrained object detection service. As above, the object detection server 150 can include a pretrained object detection service such as Amazon Rekognition, Google Vision, a pre-trained neural network, a customized neural network, and other object detection services.

In block 322, the object detection server 150 identifies and generates a resultant object label or a set of labels for each of the unannotated images. The set of object labels may include zero or more object labels. The object label(s) represent the objects appearing within that image. That is, the object labels are a list of what the object detection server 150 thinks it sees in the image. For example, the object labels generated by the object detection server 150 can include "Plant potted Plant indoors Interior Design Room Bedroom Lamp Lampshade Table Lamp Apartment Housing Lighting Dining Room Shelf Furniture Table Tabletop." The set of object labels also includes a confidence score for each of the object labels in the set as described above. The pretrained object detection service can include you only look once (YOLO), single shot multibox detector (SSMD), AWS Rekognition, Google Cloud Vision Object Detection Service, Viola-Jones detection framework, scale-invariant feature transform (SIFT), and/or histogram of ordered gradients (HOG).

In block 325, the resultant set of object labels identified by the pretrained object detection server 150 for each unannotated stored are recorded in an image metadata database 126. Once the images object labels are generated and stored, the process moves to a prediction phase.

Using the Model—Prediction Phase

In one example embodiment of the invention, the prediction phase can include pre-processing the derived object detection labels for the unannotated digital image as input features to a trained multi-label classification model. The pre-processing can include converting the associated set of object labels from a plaintext n-gram representation into an encoded multilabel format of a binary string indicating the presence or absence of a particular label or n-gram from the set of all training labels. Once the pre-processing is complete, in block 330, the (encoded) multi-label object detection label set is sent to the multi-label classification processor 112, where the set is ingestion by the trained multi-label classification model.

In block 332, the multi-label classification processor 112 predicts a set of final taxonomy labels for each (previously) unannotated image based upon the processing of the multi-label classification model. The annotation labels for the unannotated image can be generated by the multi-label classification processor 112 in the feature extraction server 110 using a convolutional neural network (CNN) implementing you only look once (YOLO) or single shot multibox detector (SSMD), Viola-Jones detection framework, scale-invariant feature transform (SIFT), and/or histogram of ordered gradients (HOG). From the example object labels above "Plant potted Plant indoors Interior Design Room Bedroom Lamp Lampshade Table Lamp Apartment Housing Lighting Dining Room Shelf Furniture Table Tabletop" are used as inputs to the multi-label classification processor 112, which can return multiple labels including "dining room," "oak," and other labels.

In block 335, the set of predicted final taxonomy labels for each ingested unannotated image is stored in image metadata database 126 as metadata associated with the previously unannotated digital image for later retrieval. Storing the set of predicted final taxonomy labels for each ingested unannotated image in the image metadata database 126 can include appending the metadata record to include the set of predicted final taxonomy labels. In some implementations of the invention, each of the set of predicted final taxonomy labels are nodes in a constrained enterprise taxonomy graph database.

In some implementations of the invention, the set of predicted final taxonomy labels includes a set of location strings, where each location string denotes a path through the constrained enterprise taxonomy graph database to a unique node in the graph database.

In block 340, the previously unannotated digital image(s) are annotated with the set of predicted final taxonomy labels. The annotating includes linking the file with the stored predicted set of final taxonomy labels in the image metadata database 126 to a file with the previously unannotated digital image record in the ingested image database 130.

In some example implementations of the invention, the system can verify the predicted final taxonomy labels are in compliance with an enterprise style guide, where the enterprise style guide provides predetermined guidelines for the form of the predicted final taxonomy labels. Additionally, the set of final taxonomy labels can be converted into a human-readable representation.

The annotated images can be consumed in many ways. In one example embodiment of the invention, the annotated images can be delivered to a message bus and/or an enterprise service bus for consumption by an enterprise server (not shown separately) and/or the annotated images can be delivered on the message bus and/or the enterprise service bus to a web browser 182 and a content creator processor 181 based on the set of predicted final taxonomy labels. Once the annotated images are delivered to a message bus or an enterprise service bus, or to a user computer 180, the (now) annotated images can be forwarded to distribution channels, advertisers, and other consumers of digital content.

Rudimentary Example

A rudimentary initial use case included a single image, and the system 100 of the invention was designed to analyze the single image and provide a description of what type of room the image depicted, or what type of furniture was shown, or what color the room was, or is it an indoor or outdoor space.

Other Examples

The system and method of the invention has been extended to a number of use cases, such as identifying furniture styles for targeted advertisements, room styles to show as clickstream data, and other automated metadata characteristics.

Tests were run on a system 100 of the invention on a training set of 15,000 images previously categorized by humans, from a digital (properties) library.

The system 100 took these images (approximately 15,000), previously categorized by humans, and processed them through the invention to obtain a list of text labels for each image. The system of the invention used these feature labels as inputs to a machine learning model multinomial logistic regression (for example, see the scikit-learn library), to perform a multi-class classification on the training set.

Initial results show an average approximate 75% success rate, in classifying these images into one of six provided categories.

Other Digital Image and Video Examples

Other related use cases were also tested, including using the systems and methods of the invention to provide automated metadata analysis to determine information for video operations including detecting onscreen text via Optical Character Recognition (OCR) for video assets, and used the detected, recognized, and extracted text and URLs to validate distributor terms of service against rulesets and agreements to ensure compliance.

The system 100 has also been used to provide a description of the video (automated captioning) based upon the objects that appear within the video. Similarly, the system 100 has been used to recognize and catalogue talent appearing in a video for legal or metadata purposes, capture logos (e.g., Coca Cola® or Home Depot®, and others) and flag these videos using a time series index to generate revenue based on product placement.

Additionally, the system 100 has been used to recognize and tag landmarks (e.g., London Bridge, Eiffel Tower, Six Flags Georgia, and others) as well as recognizing particular images to prohibit transfer of those underlying digital images or videos to culturally sensitive areas (e.g., prevent pork or alcohol images from being sent to strict Muslim areas or restricting other potentially sensitive content from distribution to particular regional markets). The system 100 can also be used in caption file analysis, where, given a caption file, inject and store it into a database (e.g., DynamoDBm Elasticsearch, and others) for later retrieval. Facial recognition searching has been greatly improved with the system and method of the invention. Instead of searching through terabytes of facial images, using the system and method of the invention, media talent within a given a set of images can be quickly identified and catalogued from within the images (e.g., Alton Brown, Giada de Laurentiis, and other talent).

Methods currently exist to perform graphical analysis against images, and run them through a similar bag of words model. However, these existing techniques do not use text labels, nor deep learning for text-based feature analysis and classification, and the results are not stored in time series or NoSQL databases for processing and querying. These features of the invention provide improved performance and relevant results sets.

Additionally, the system 100 has been used to provide a list of suggested tags for content editors. In a user interface, a content creator had been manually annotating digital images to add tags from an enterprise taxonomy. In the new process using system 100, a content editor imports a set of digital images. These images are placed in a processing queue and submitted to system 100. A list of suggested tags for each image, populated by the prediction phase of system 100, is presented in a graphical window of the content editor's terminal, saving time and resources estimated at over $100,000 a year.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the bounds of the appended claims. For example, it is to be understood that the present technology contemplates that, to the extent possible, one or more features of any implementation can be combined with one or more features of any other implementation.

What is claimed is:

1. A computer-implemented method for generating a trained model for a multi-label classification system, the computer-implemented method comprising:
    under control of a feature extraction server configured with specific computer executable instructions,
    ingesting a training set of pre-labeled training images from a content management system (CMS) with a receiving processor;
    ingesting a set of associated ground truth labels, with each pre-labeled training image having a unique ground truth label set from a constrained enterprise taxonomy;
    storing the ingested training set of images in an ingested image database;
    storing the set of associated ground truth labels in an image metadata database;
    recording, in a training parameter database, a set of all unique ground truth labels identified from the ingested training set of images
    importing each stored image of the training set of images into an object detection server, wherein the object detection server includes a pretrained object detection service that identifies a resultant set of object labels for each of the training set of images;
    recording, in the image metadata database, the resultant object labels identified by the pretrained object detection server for each stored image of the training set;
    recording, in a training parameter database, a set of all unique object detection labels identified from importing the training set of images into the object detection server;
    training at least one multi-label classification algorithm running on a multi-label classification processor to ingest the multi-label object detection labels and the multi-label ground truth labels to map the set of object classification labels into a proprietary taxonomy, wherein the multi-label classification algorithm includes:
        submitting the multi-label object detection labels as inputs to the multi-label classification algorithm,
        submitting the multi-label ground truth labels from the enterprise taxonomy as outputs from the multi-label classification algorithm,
        discriminatively predicting the multi-label object detection labels using at least one of a support vector machine, a Bayes classifier, a neural network, a Random Forest method, and a deep learning method neural network,
        comparing the multi-label classification output of a discriminatively categorized object detection label set associated with an image from the training set, to the ground truth label set for that same image, wherein comparing includes:
            measuring a loss between the multi-label classification output of a discriminatively categorized object detection label set and the ground truth label set using at least one of a maximum likelihood estimation (MLE), a mean squared error (MSE), Hamming distance, or Jaccard difference;
            iteratively adjusting model parameters according to the algorithm to minimize loss; and
        saving a trained model for the multi-label classification system resulting from the training of at least one multi-label classification algorithm and the comparison of the output discriminatively categorized object classification label and the ground truth labels in a model library database.

2. The computer-implemented method for generating a trained model for a multi-label classification system of claim 1, wherein the ingested training set of images is stored in an ingested images database, and the set of associated ground truth labels are stored as metadata in a separate image metadata database.

3. The computer-implemented method of claim 2, wherein each of the set of ground truth labels includes a link to at least one image in the training set of images.

4. The computer-implemented method for generating a trained model for a multi-label classification system of claim 1, wherein each of the set of ground truth labels includes a confirmed descriptive characteristic of the pre-labeled image.

5. The computer-implemented method for generating a trained model for a multi-label classification system of claim 4, wherein the confirmed descriptive characteristic of the pre-labeled image is selected from the constrained enterprise taxonomy.

6. The computer-implemented method for generating a trained model for a multi-label classification system of claim 1, wherein the pretrained object detection service includes at least one of a convolutional neural network implementing you only look once (YOLO) or single shot multibox detector (SSMD), AWS Rekognition, Google Cloud Vision Object Detection Service, Viola-Jones detection framework, scale-invariant feature transform (SIFT), and histogram of ordered gradients (HOG).

7. The computer-implemented method for generating a trained model for a multi-label classification system of claim 1, wherein importing each stored image of the training set of images into the object detection server includes transforming each stored image into a usable object detection server format, wherein the transforming includes at least one of scaling and normalization.

8. The computer-implemented method for generating a trained model for a multi-label classification system of claim 1 further comprising:
    pre-processing the object detection labels as input features to the at least one multi-label classification algorithm, wherein the pre-processing includes:
        converting the set of all unique object labels into an encoded multi-label format for an input of the trained model for a multi-label classification system; and
        converting the set of associated ground truth labels into the encoded multi-label format as an output of the trained model for a multi-label classification system.

9. The computer-implemented method for generating a trained model for a multi-label classification system of claim 1, wherein training the at least one multi-label classification algorithm includes training with at least one of a trained support vector machine, a Bayes classifier, a neural network, a Random Forest method, and a deep learning method.

10. The computer-implemented method for generating a trained model for a multi-label classification system of claim 9 further comprising:
creating multi-label classifiers for each stored image based on the training of the at least one multi-label classification algorithm.

11. The computer-implemented method for generating a trained model for a multi-label classification system of claim 1 further comprising:
measuring accuracy of the object detection results to the multi-label classification with at least one of Jaccard similarity coefficient, Hamming distance, and Simple Matching Coefficient (Rand similarity coefficient).

12. The computer-implemented method for generating a trained model for a multi-label classification system of claim 11 further comprising:
tuning the generated model, including:
identifying an appropriate accuracy metric for multi-class or multi-label classification, including measuring a relationship between input ground truths and output multi-label results from the multi-label classification model using at least one of Jaccard similarity coefficient, Hamming distance, and simple matching coefficient,
comparing the measured relationship to a pre-determined multi-label prediction performance criterion; and if the measured relationship does not meet or exceed the multi-label prediction performance criterion, performing at least one of:
adjusting at least one of label confidence thresholds and label n-gram tokenization of the pre-trained object detection service to improve multi-label prediction performance;
modifying the pre-trained object detection service to include at least one of a neural network, logistic regression, and random forest, to improve multi-label prediction performance;
amending hyperparameters in as the object detection service, wherein the hyperparameters include at least one of random forest maximum depth or number of estimators and neural network architecture or learning rate to improve multi-label prediction performance;
augmenting the ingested training set of pre-labeled training images using at least one of translation, mirroring, rotation, and cropping;
repeating at least one of the adjusting, modifying, amending, and augmenting steps until the measured relationship meets or exceeds the pre-determined multi-label prediction performance criterion.

13. The computer-implemented method for generating a trained model for a multi-label classification system of claim 1 further comprising:
deriving a set of unique object labels appearing in the training set of images;
creating a vector input space based on the derived set of unique object labels;
converting the object detection label set for each of the training set of images to a binary multi-label representation based on the created vector space; and
submitting the encoded binary representation as inputs to the multi-label classification algorithm.

14. The computer-implemented method for generating a trained model for a multi-label classification system of claim 13 further comprising:

receiving a set of unique ground truth labels appearing in the training set of images;
creating a vector output space based on the derived set of received ground truth labels;
converting the ground truth labels for each of the training set of images to a binary multi-label representation based on the created vector space; and
comparing the output of the discriminatively categorized object detection label set of the multi-label classification algorithm to the converted ground truth label set.

15. A computer-implemented method for using a trained model to predict multi-label classification of an image, the computer-implemented method comprising:
under control of a feature extraction server configured with specific computer executable instructions,
ingesting an unannotated digital image with a receiving processor;
storing the ingested unannotated digital image in an ingested image database;
creating a metadata record for the unannotated digital image, wherein the metadata record includes a unique identifier indicating a location where the ingested unannotated digital image is stored;
importing each unannotated digital image into an object detection server, wherein the object detection server includes a pretrained object detection service that identifies a resultant set of object labels for each of the training set of images;
recording, in an image metadata database, the resultant set of object labels identified by the pretrained object detection server for each stored image of the training set;
pre-processing the derived object detection labels for the unannotated digital image as input features to a trained multi-label classification model, wherein the pre-processing includes:
converting the associated set of object labels from a plaintext n-gram representation, into an encoded multilabel format of a binary string indicating the presence or absence of a particular label or n-gram from the set of all training labels, appropriate for ingestion by the trained multi-label classification model;
predicting a set of final taxonomy labels based upon the processing of the multi-label classification model;
storing the set of predicted final taxonomy labels for each ingested unannotated image in an image metadata database as metadata associated with the previously unannotated digital image for later retrieval;
annotating the previously unannotated digital image with the set of predicted final taxonomy labels, wherein the annotating includes linking a file with the stored predicted set of final taxonomy labels to a file with the previously unannotated digital image record; and
delivering the annotated image to at least one of a message bus and an enterprise service bus for consumption by an enterprise server.

16. The computer-implemented method for using a trained model to predict multi-label classification of an image of claim 15, wherein storing the set of predicted final taxonomy labels for each ingested unannotated image in an image metadata database includes appending the metadata record to include the set of predicted final taxonomy labels.

17. The computer-implemented method for using a trained model to predict multi-label classification of an image of claim 15, wherein the unique identifier is created as a fingerprint from at least one of an MD5, SHA-1, and SHA-256 hash sum of the unannotated image and the URL of the unannotated digital image ingested.

18. The computer-implemented method for using a trained model to predict multi-label classification of an image of claim 15, wherein the pretrained object detection service includes at least one of you only look once (YOLO), single shot multibox detector (SSMD), AWS Rekognition, Google Cloud Vision Object Detection Service, Viola-Jones detection framework, scale-invariant feature transform (SIFT), and histogram of ordered gradients (HOG).

19. The computer-implemented method for using a trained model to predict multi-label classification of an image of claim 15, wherein the set of preliminary annotation labels for the unannotated image is generated by a multi-label classification processor in the feature extraction server by an object detection service that includes at least one of a convolutional neural network (CNN) implementing you only look once (YOLO) or single shot multibox detector (SSMD), AWS Rekognition, Google Cloud Vision Object Detection Service, Viola-Jones detection framework, scale-invariant feature transform (SIFT), and histogram of ordered gradients (HOG).

20. The computer-implemented method for using a trained model to predict multi-label classification of an image of claim 15 further comprising:

converting the set of final taxonomy labels into a human-readable representation.

21. The computer-implemented method for using a trained model to predict multi-label classification of an image of claim 15 further comprising:

verifying the predicted final taxonomy labels comply with an enterprise style guide, wherein the enterprise style guide provides predetermined guidelines for the form of the predicted final taxonomy labels.

22. The computer-implemented method for using a trained model to predict multi-label classification of an image of claim 15, wherein each of the set of predicted final taxonomy labels are nodes in a constrained enterprise taxonomy graph database.

23. The computer-implemented method for using a trained model to predict multi-label classification of an image of claim 15 further comprising:

delivering the annotated image on the at least one of the message bus and the enterprise service bus to at least one of a web browser and a content creator server based on the set of predicted final taxonomy labels.

* * * * *